US008503175B2

(12) United States Patent
Gandhi et al.

(10) Patent No.: US 8,503,175 B2
(45) Date of Patent: Aug. 6, 2013

(54) SYSTEM AND METHOD FOR VARIABLE FORM HANDHELD COMPUTER CONFIGURABLE VIA MODULAR DISPLAY SCREEN

(75) Inventors: Dinesh Nataly Gandhi, Brampton (CA); Michael Gleeson, Whitby (CA)

(73) Assignee: Psion Inc., Mississauga, Ontario (CA)

( * ) Notice: Subject to any disclaimer, the term of this patent is extended or adjusted under 35 U.S.C. 154(b) by 320 days.

(21) Appl. No.: 12/765,927

(22) Filed: Apr. 23, 2010

(65) Prior Publication Data

US 2011/0211305 A1 Sep. 1, 2011

Related U.S. Application Data

(63) Continuation-in-part of application No. 12/713,527, filed on Feb. 26, 2010, now Pat. No. 8,295,038.

(51) Int. Cl.
*H05K 5/00* (2006.01)
*H04M 1/00* (2006.01)
*G06F 3/02* (2006.01)
*G06F 3/033* (2006.01)

(52) U.S. Cl.
USPC ............ 361/679.56; 361/679.13; 361/679.16; 361/679.17; 455/575.1; 455/575.3; 455/575.4; 455/575.8; 345/168; 345/169; 345/184

(58) Field of Classification Search
USPC ........................ 361/807–812, 679.01, 679.02, 679.55–679.59, 679.27; 455/325, 556.1, 455/550.1, 90.1, 575.1; 345/156, 157, 168, 345/169, 184
See application file for complete search history.

(56) References Cited

U.S. PATENT DOCUMENTS

2003/0038786 A1  2/2003 Nguyen et al.
2005/0105258 A1* 5/2005 Tanaka et al. .................. 361/681
2009/0295943 A1* 12/2009 Kim et al. ................ 348/231.99

OTHER PUBLICATIONS

Non Final Office Action mailed May 8, 2012 in counterpart U.S. Appl. No. 12/713,527, Michael Gleeson, filed Feb. 26, 2010.
Notice of Allowance mailed Aug. 31, 2012 in counterpart U.S. Appl. No. 12/713,527, Michael Gleeson, filed Feb. 26, 2010.

* cited by examiner

*Primary Examiner* — Jayprakash N Gandhi
*Assistant Examiner* — Jerry Wu

(57) ABSTRACT

A variable form handheld computer may be configurable either as a short form handheld computer or as long form handheld computer. The variable form handheld computer comprises a variable form housing frame configurable as either a short form housing frame or a long form housing frame. The variable form housing frame comprises a plurality of handheld computing modules comprising a keyboard module, a circuitry module, a battery module and a variable form display screen. The variable form display screen is configurable either as a short form display screen or a long form display screen. The long form housing frame securely frames the handheld computing modules when the variable form display screen is configured as the long form display screen, and the short form housing frame securely frames the plurality of computing modules when the variable form display screen is configured as the short form display screen. The variable form handheld computer is configurable as the long form handheld computer using the long form housing frame, and is configurable as the short form handheld computer using the short form housing frame.

16 Claims, 3 Drawing Sheets

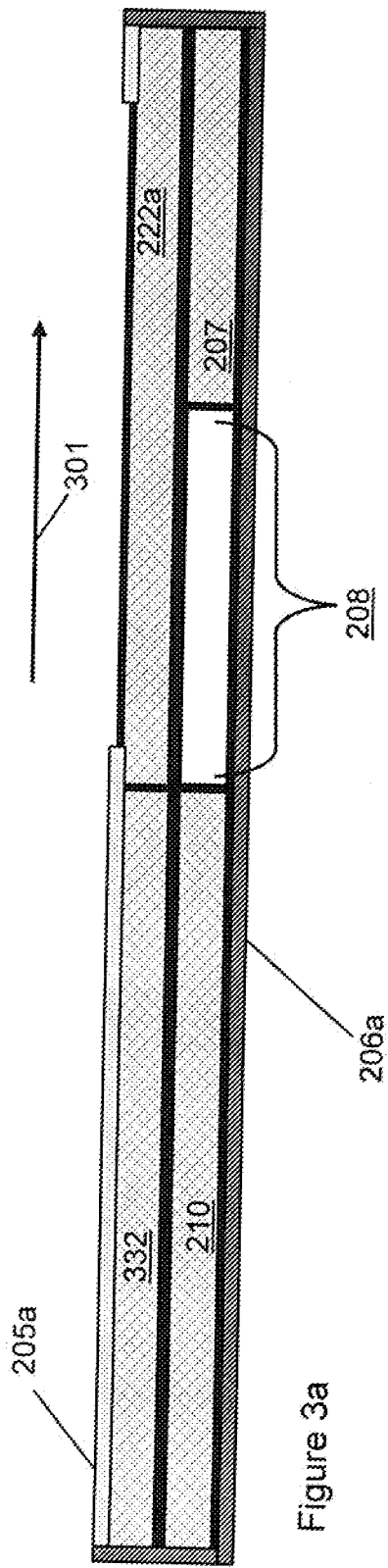
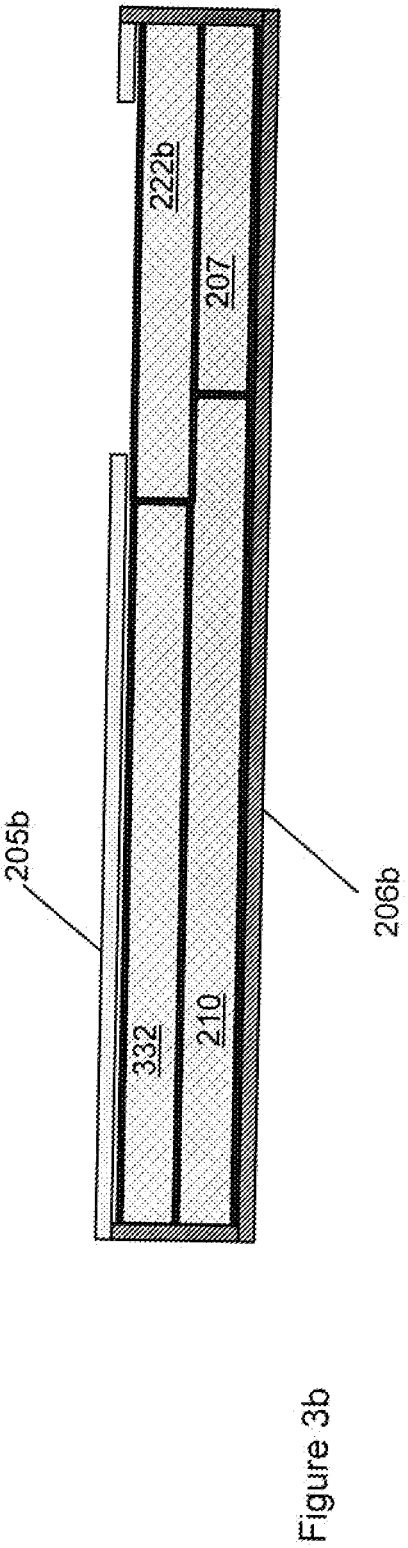
Figure 3a
Figure 3b

SYSTEM AND METHOD FOR VARIABLE FORM HANDHELD COMPUTER CONFIGURABLE VIA MODULAR DISPLAY SCREEN

CROSS-REFERENCE TO RELATED APPLICATIONS

This application is a continuation-in-part of U.S. patent application Ser. No. 12/713,527 filed on Feb. 26, 2010, now U.S. Pat. No. 8,295,038 and hereby claims priority thereto.

FIELD

The present disclosure relates generally to a method and apparatus for configuring variable-form handheld computing devices via use of modular display screens, while maximizing commonality of other functional or mechanical modules used in the variable-form handheld computing device.

BACKGROUND

Handheld mobile computing devices have proliferated as their usefulness and functionality have improved. To the extent that the handheld device may be configurable or customizable based on varying user needs, the utility of the devices is enhanced.

Handheld computers are available with various means of user input functionality. For example, touchscreen displays may be especially desirable for applications where conventional display screens and mouse systems do not allow a satisfactory, intuitive, rapid, or accurate interaction by the user with the display's content. The touchscreen enables a user to interact directly with the information displayed on the display screen, rather than indirectly in the case of a mouse or touchpad. For users of touchscreen-based devices, therefore, a larger display screen of increased display surface area for user interaction would enhance the practicability of the touchscreen user interface. Accordingly, such a class of user will prefer a larger size display screen, given their needs or applications for handheld computing.

It would therefore be advantageous for a manufacturer of handheld computers to provide a handheld computer having different variations of display screen sizes and functionality suited to the needs of different classes of users, while maintaining, or at least maximizing, commonality of other components and functional modules of the handheld computer.

SUMMARY OF THE INVENTION

Provided is a variable form housing frame of a handheld computer, the variable form housing frame configurable as either a short form housing frame or a long form housing frame. The variable form housing frame comprises a plurality of handheld computing modules, the plurality of handheld computing modules comprising a display module, a circuitry module, a battery module; and a variable form display screen, the variable form display screen configurable either as a short form display screen or a long form display screen, wherein the long form housing frame securely frames the plurality of handheld computing modules when the variable form display screen is configured as the long form display screen, and the short form housing frame securely frames the plurality of computing modules when the variable form display screen is configured as the short form display screen.

BRIEF DESCRIPTION OF THE DRAWINGS

Embodiments will now be described by way of example only, with reference to the following drawings in which:

FIG. 3a is a conceptual diagram showing an exemplary long form configuration of the variable form handheld computer; and FIG. 3b is a conceptual diagram showing an exemplary short form configuration of the variable form handheld computer.

DETAILED DESCRIPTION

It would be advantageous to provide a handheld computer which is configurable via varying form factor display screens while maximizing commonality of other components or functional modules of the handheld computer.

In addition to providing increased customer choices within a given and familiar handheld computer platform, by maximizing commonality of component and functional module types, a manufacturer is able to minimize the number of different input raw materials needed, positively impacting manufacturing expenses. Such a solution would also enable late-stage customization of handheld computers having display screen modules of different physical sizes and form factors during the manufacturing assembly process. Providing such late-stage customization or configuration capability also positively affects the component inventory carrying costs for inventory that a manufacturer needs to have on hand to support manufacturing assembly and production of differing versions or families of handheld computers. Such goals can be realized, then, to the extent that the handheld computer may be customized by selecting a particular one of several alternative display screen module configurations in conjunction with a standard set of other components and functional modules, based on a family of devices with shared components or componentry modules.

Figure 1:
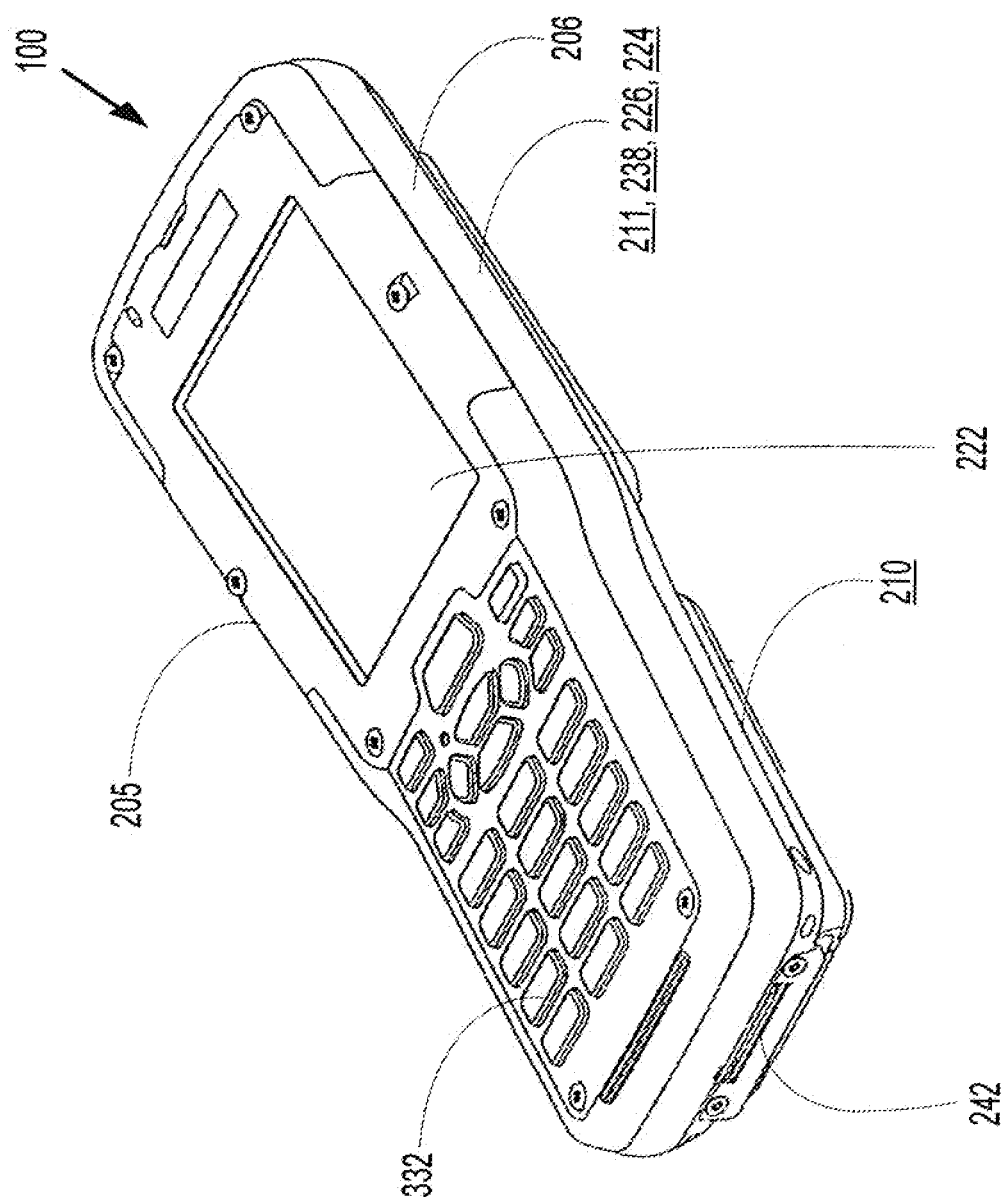
FIG. 1 illustrates an exemplary variable form handheld device having a modular display screen.

Referring now more particularly to the accompanying figures, FIG. 1 illustrates an exemplary embodiment of a variable form handheld computer 100 having a modular display screen 222. Variable form handheld computer 100 will be referred to variously and interchangeably as a handheld computer, a handheld device, a mobile computer, a mobile device or handheld computing device in the disclosure herein. The variable form handheld computer 100 may have the capability of communicating at least data, and possibly both data and audio, to and from servers as well as data acquisition sources within a communication network.

Still with reference to FIG. 1, the variable form handheld computer 100 may comprise a housing frame, the housing frame comprising top bezel housing frame 205 and a bottom bezel housing frame 206. In one embodiment, top bezel housing frame 205 may be detachably coupled to bottom bezel housing frame 206. The top bezel housing frame 205 may house a modular display screen 222, meaning that display screen 222 may be selected from a family of display screens having varying dimensional form factors, lengths, or sizes, including, but not limited to, portrait and landscape display screen form factors.

Display screen module 222, as will be described in more detail later, and as depicted in exemplary manner in FIGS. 3a and 3b, may be configured as either a long form display screen 222a or a short form display screen 222b.

In one embodiment depicted in FIG. 1, top bezel housing frame 205 may securely house display screen module 222 and keyboard module 332. By use of the term "house", it is meant that a module, such as display screen module 222 and keyboard module 332, is substantially located or disposed within top bezel housing frame 205. By substantially, it is meant at least 60% of the volumetric footprint of any module, including display screen module 222 and keyboard module 332. Display screen module 222 and keyboard module 332 may be located physically abutting each other, in a generally coplanar disposition (such as within 15 degrees of alignment with each other) as depicted in FIG. 1, and also in FIGS. 3a, 3b.

Continuing with the embodiment depicted in exemplary manner in FIG. 1, bottom bezel housing frame 206 may house battery module 210 and circuitry module 207. Again, by use of the terms "house" or "housing" as verbs, it is meant that a module, including battery module 210 and circuitry module 207, are substantially located or disposed within bottom bezel housing frame 206. Circuitry module 207 may include any combination of electronic componentry of the handheld computer 100, such as any combination of wireless communication subsystem 211, microprocessor 238, random access memory 226 and flash memory 224. However, it will be appreciated by those of skill in the art that circuitry module 207 may not exclusively house all of the electronic components and interconnections necessary for handheld computer 100 to function as intended.

In one embodiment, bottom bezel housing frame 206 may completely, or partially, house a connector slot 242 whereby an external power source may be electrically coupled to the electrical contacts of a rechargeable embodiment of battery module 210. It is also contemplated that connector slot 242 may provide electrical and/or mechanical coupling means for receiving handheld computer in a cradle peripheral device, such as for data synchronization with other computing devices or servers, and for electrical power charging.

Figure 2:
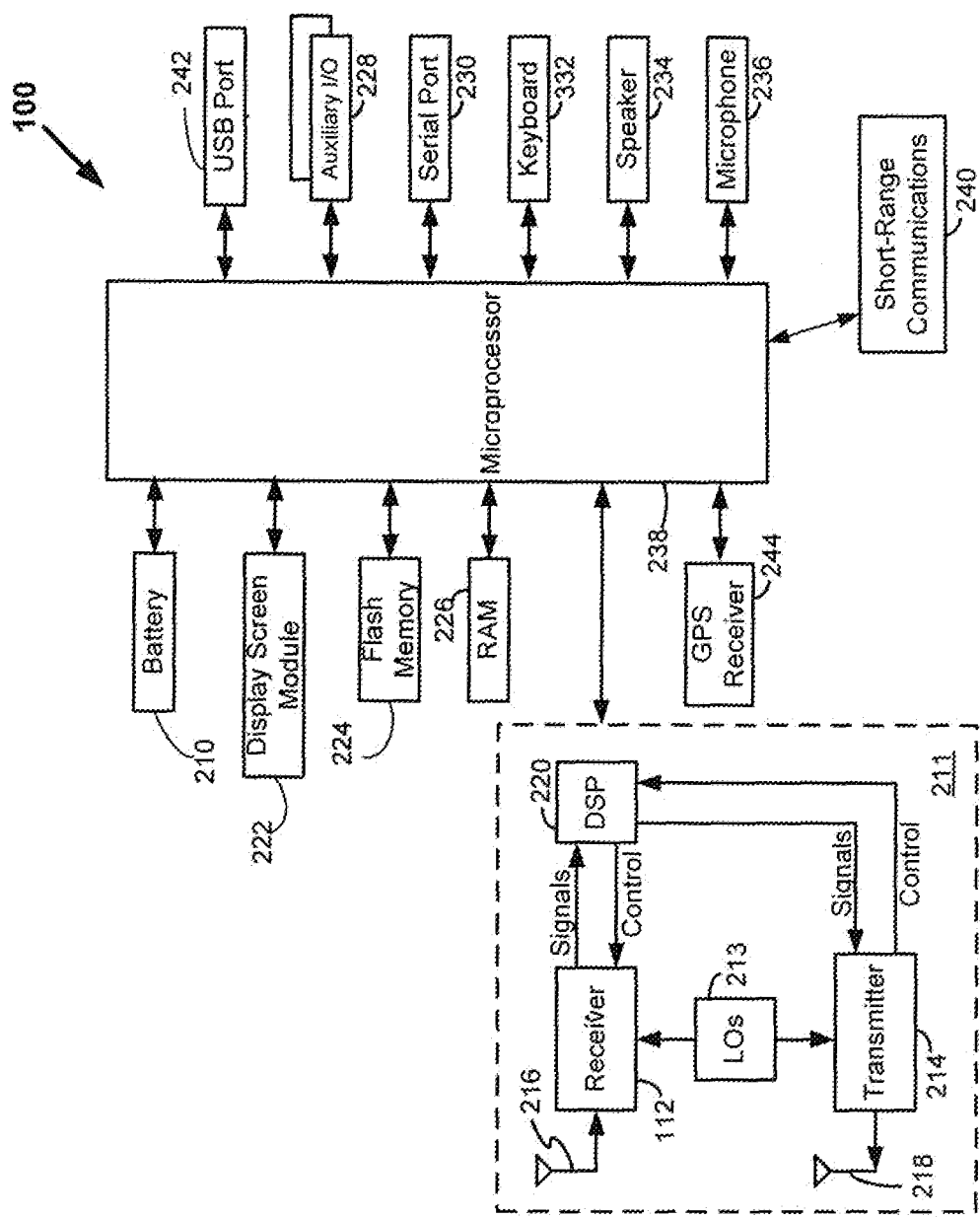
FIG. 2 is an exemplary conceptual diagram illustrating an embodiment of the components and functional subsystems of the variable form handheld device.

Referring now to FIG. 2, an exemplary architecture of the variable form handheld computer 100 is shown. Variable form handheld computer 100 may include wired or wireless communication capability. In the wireless configuration, handheld computer 100 typically includes radio frequency (RF) communication subsystem 211, which includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in field of communications, the particular design of the RF communication subsystem 211 depends on the specific communication network in which environment control device 100 is intended to operate, but may include communication functionalities such as radiofrequency identification (RFID), Wi-Fi WLAN based on IEEE 802.11 standards, Zigbee, Z-Wave and the like.

The handheld device 100 includes a microprocessor 238 which controls general operation of the handheld device 100. The microprocessor 238 also interacts with functional device subsystems such as keyboard module 332, flash memory 224, random access memory (RAM) 226, auxiliary input/output (I/O) subsystems 228, serial port 230, display screen module 222, speaker 234, microphone 236, short-range communications subsystem 240 such as Bluetooth™ for example, and Universal Serial Bus (USB) expansion port 242 for peripheral. The handheld device 100 may include a power source such as battery module 210 which may also be removable and replaceable from the handheld device. The handheld device 100 may also include a positioning device 244, such as a GPS receiver for example, for receiving positioning information.

Still with regard to FIG. 2, operating system software used by the microprocessor 238 may be stored in a persistent store such as the flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

The microprocessor 238, in addition to its operating system functions, enables execution of software applications on the handheld device 100. A predetermined set of applications, which control basic device operations, may be installed on the handheld device 100 during its manufacture. These basic operations typically include data and voice communication applications, for example. Additionally, applications may also be subsequently loaded onto the handheld device 100 through the communication subsystem 211, an auxiliary I/O subsystem 228, serial port 230, USB port 242, short-range communications subsystem 240, or any other suitable subsystem, and installed by a user in RAM 226, or the persistent store 224, for execution by the microprocessor 238. Such flexibility in application installation increases the functionality of the handheld device 100 and may provide enhanced on-device features, communication-related features, or both.

Display screen module 222 is used to visually present an application's graphical user interface (GUI) to the user via a display screen. The display screen module 222 may employ a touchscreen display, in which case the user can manipulate application data by modifying information on the GUI using direct touches by finger, including by multi-touch functionality. Depending on the type of handheld device 100, the user may have access to other types of input devices, such as, for example, a scroll wheel, trackball, light pen or touch sensitive screen.

FIGS. 3a and 3b depict an exemplary variable form handheld computer 100 configured by use of a variable form housing frame. While variable form is described herein in terms of long form and short form, and with reference to handheld computer 100, housing frame portions 205, 206 and display screen module 222, it is contemplated that a family (meaning more than two) of form factors, or lengths, of housing frames and display screens may be used to configure handheld computer 100 according to various desired form factors.

In FIG. 3a, an exemplary long form version of handheld computer 100, or long form handheld computer 100, is defined by use of a long form housing frame. The long form housing frame comprises a long form top bezel housing frame 205a detachably coupled (according to one embodiment) to a long form bottom bezel housing frame 206a. Long form top bezel housing frame 205a substantially houses a long form factor, or long form, display screen 222a and keyboard module 332. Long form display screen module 222a and keyboard module 332 lie in a generally planar disposition defined along a longitudinal axis 301, and in one embodiment as depicted, are in physical abutment. Long form bottom bezel 206a substantially houses battery module 210 and circuitry module 207 arranged in a generally coplanar disposition defined along longitudinal axis 301. In one embodiment depicted, battery module 210 and circuitry module 207 have a gap 208 therebetween.

It is also contemplated that battery module 210 and circuitry module 207 may be positioned physically abutting each other, so that any resulting gap will exist at an end of either of the battery module 210 or circuitry module 207, within In another embodiment, it is contemplated that circuitry module 207 may be selectable from among several options, depending on the form or option selected for display screen module 222, within long form bottom bezel housing frame 206a.

In FIG. 3b, an exemplary short form version of handheld computer 100, or short form handheld computer 100, is defined by use of a short form housing frame. The short form housing frame comprises a short form top bezel housing frame 205b detachably coupled (according to one embodiment) to a short form bottom bezel housing frame 206b. Short form top bezel housing frame 205b substantially houses a short form factor, or short form, display screen 222b and keyboard module 332. In one embodiment, short form display screen module 222b and keyboard module 332 lie in a generally planar disposition defined along longitudinal axis 30, and are in physical abutment. Short form bottom bezel housing frame 206b substantially houses battery module 210 and circuitry module 207 arranged in a generally coplanar disposition defined along longitudinal axis 301, and in the embodiment depicted, are in physical abutment.

In both embodiments of FIGS. 3a and 3b, the top and bottom bezel housing frame portions securely frame the plurality of handheld computing modules including the battery 210, display screen, and respective display screen module 222a, 222b with circuitry module 207.

With regard to FIG. 3a, it is contemplated that the length of gap 208 is substantially representative of the difference in length between long form display screen 222a and short form display screen 222b, measured along longitudinal axis 301. In one embodiment, it is contemplated that the length of gap 208 may be at least a half an inch.

Long form display screen 222a may comprise a touchscreen display oriented in a portrait format. It is contemplated that short form display screen 222b, on the other hand, may comprise a shortened display comparable to a landscape orientation, depending on the class of user or market usage targeted by the manufacturer of handheld computer 100.

Still with regard to FIGS. 3a and 3b, the structure provided also allows for severability and reuse of keyboard module 332, battery module 210 and circuitry module 207 during repair of the various models comprising the family of handheld computers, enhancing the practicability and economics of replacing individual components or modules.

Although a mobile or handheld computer has been used to establish a context for disclosure herein, it is contemplated as having much wider applicability within the field of handheld devices. Furthermore, the disclosure herein has been described with reference to specific exemplary embodiments; however, varying modifications thereof will be apparent to those skilled in the art without departing from the scope of the invention as defined by the appended claims.

What is claimed is:

1. A handheld computer comprising: a plurality of handheld computing modules comprising:
   a keyboard module, a circuitry module, a battery module; and
   a variable form display screen, the variable form display screen configurable either as a short form display screen or a long form display screen;
   the plurality of handheld computing modules configurable to be secured by a family of different housing frames comprising a long form housing frame and a short form housing frame, one of the long form housing frame and the short form housing frame being selected during manufacture from the family of different housing frames, the plurality of handheld computing modules configurable to be secured by the long form housing frame when the variable form display screen is configured as the long form display screen, and the plurality of handheld computing modules configurable to be secured by the short form housing frame when the variable form display screen is configured as the short form display screen.

2. The handled computer of claim 1 wherein the battery module comprises a rechargeable battery, the rechargeable battery including electrical contacts for electrical power charging when coupled to an external power source.

3. The handled computer of claim 2 comprising a connector slot configured to secure a connector for coupling the external power source to the electrical contacts of the rechargeable battery.

4. The handled computer of claim 1 comprising a top bezel housing portion and a bottom bezel housing portion, the top bezel portion for detachably coupling to the bottom bezel portion to securely frame the plurality of handheld computing modules.

5. The handled computer of claim 1 wherein the long form display screen comprises a touchscreen display.

6. The handled computer of claim 5 wherein the short form display screen is provided in a landscape orientation.

7. A handheld computer comprising: a plurality of handheld computing modules comprising:
   a keyboard module; a circuitry module comprising a microprocessor; a battery module; and
   a variable form display screen, the variable form display screen configurable either as a short form display screen or a long form display screen;
   the plurality of handheld computing modules configurable to be secured during manufacture by a family of different housing frames comprising a long form housing frame and a short form housing frame, the plurality of handheld computing modules configurable to be secured by the long form housing flame when the variable form display screen is configured as the long form display screen, and the plurality of handheld computing modules configurable to be secured by the short form housing frame when the variable form display screen is configured as the short form display screen; the battery module and the microprocessor of the circuitry module being configured to be relatively positioned differently when with the long form housing frame than when with the short form housing frame.

8. The handheld computer of claim 7 wherein the long form housing frame comprises a long form top bezel housing portion detachably coupled to a long form bottom bezel housing portion, the long form top bezel portion substantially housing the long form display screen and the keyboard module, the long form bottom bezel portion substantially housing the battery module and the circuitry module.

9. The handheld computer of claim 8 wherein the long form bottom bezel portion comprises the battery module extending co-planarly with the circuitry module with a substantial gap therebetween.

10. The handheld computer of claim 9 wherein the gap comprises a length substantially equal to the length differential between the long form display screen and the short form display screen as measured along a longitudinal axis of the handheld computer.

11. The handheld computer of claim 7 wherein the short form housing frame comprises a short form top bezel housing portion detachably coupled to a short form bottom bezel housing portion, the short form top bezel portion substantially housing the short form display screen and the keyboard module, the short form bottom bezel portion substantially housing the battery module and the circuitry module.

12. The handheld computer of claim 11 wherein the battery module physically abuts the circuitry module, the battery module and the circuitry module extending generally co-planarly within the short form bottom bezel housing portion.

13. A method for assembling a handheld computer, the method comprising:
  providing a plurality of handheld computing modules, the plurality of handheld computing modules comprising:
    a keyboard module,
    a circuitry module,
    a battery module;
  configuring a variable form display screen as either a short form display screen or a long form display screen;
  providing a short form housing frame as a housing frame when configuring the variable form display screen as the short form display screen and providing a long form housing frame as the housing frame when configuring the variable form display screen as the long form display screen; and
  assembling the plurality of handheld computing modules, the variable form display screen, and the housing frame.

14. The method of claim 13 further comprising providing a connector slot within the housing frame, the connector slot configured to secure a connector for coupling an external power source to electrical contacts of the battery module.

15. The method of claim 13 wherein the long form display screen comprises a touchscreen display.

16. The method of 15 wherein the short form display screen is provided in a landscape orientation.

* * * * *